No. 720,999. PATENTED FEB. 17, 1903.
G. E. BEDELL.
AWNING.
APPLICATION FILED APR. 13, 1900.
NO MODEL. 2 SHEETS—SHEET 1.
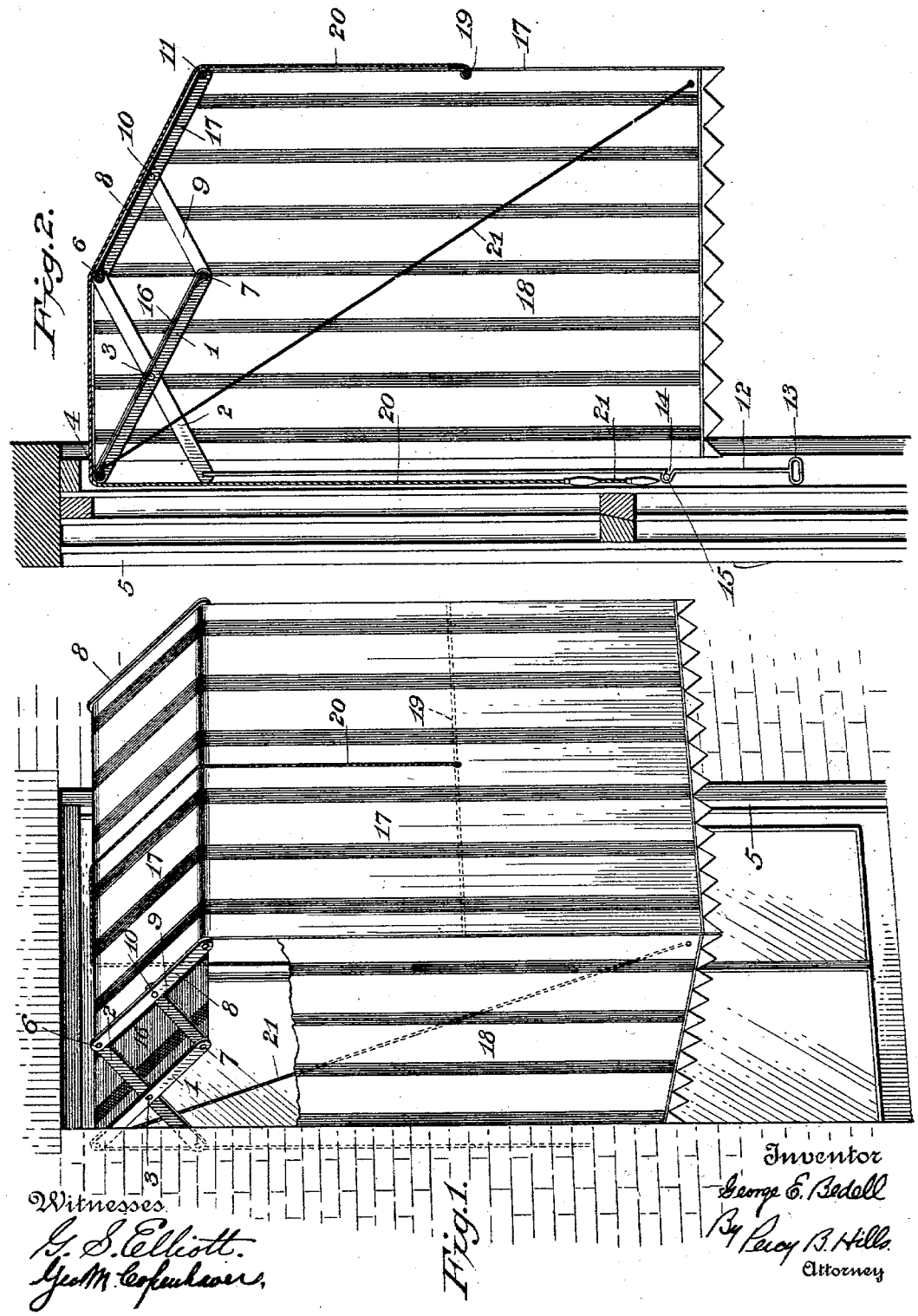
Witnesses
G. S. Elliott.
Geo. M. Copenhaver.
Inventor
George E. Bedell
By Percy B. Hills.
Attorney No. 720,999. PATENTED FEB. 17, 1903.
G. E. BEDELL.
AWNING.
APPLICATION FILED APR. 13, 1900.
NO MODEL. 2 SHEETS—SHEET 2.
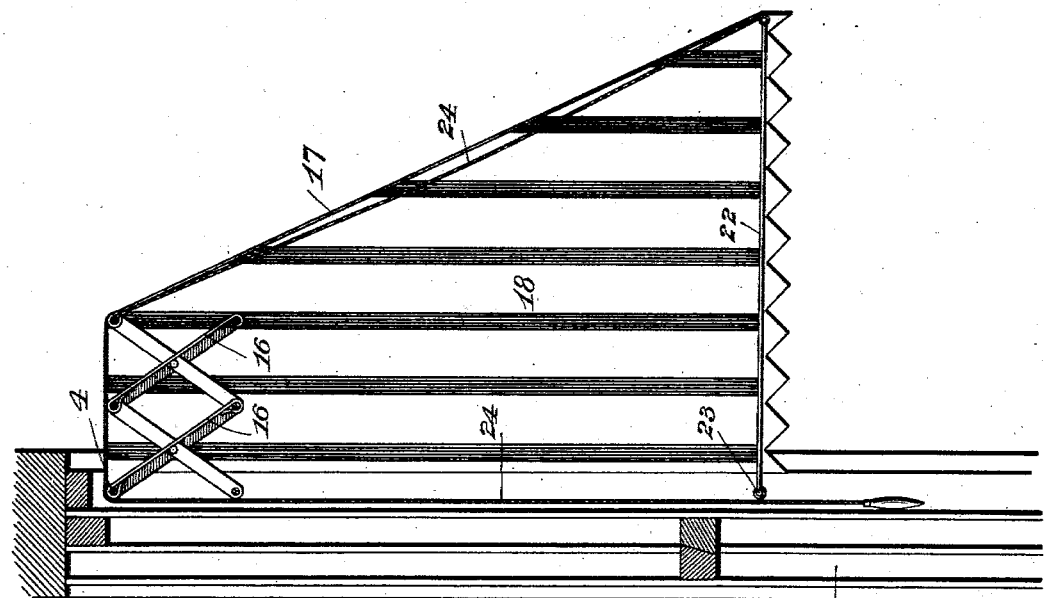
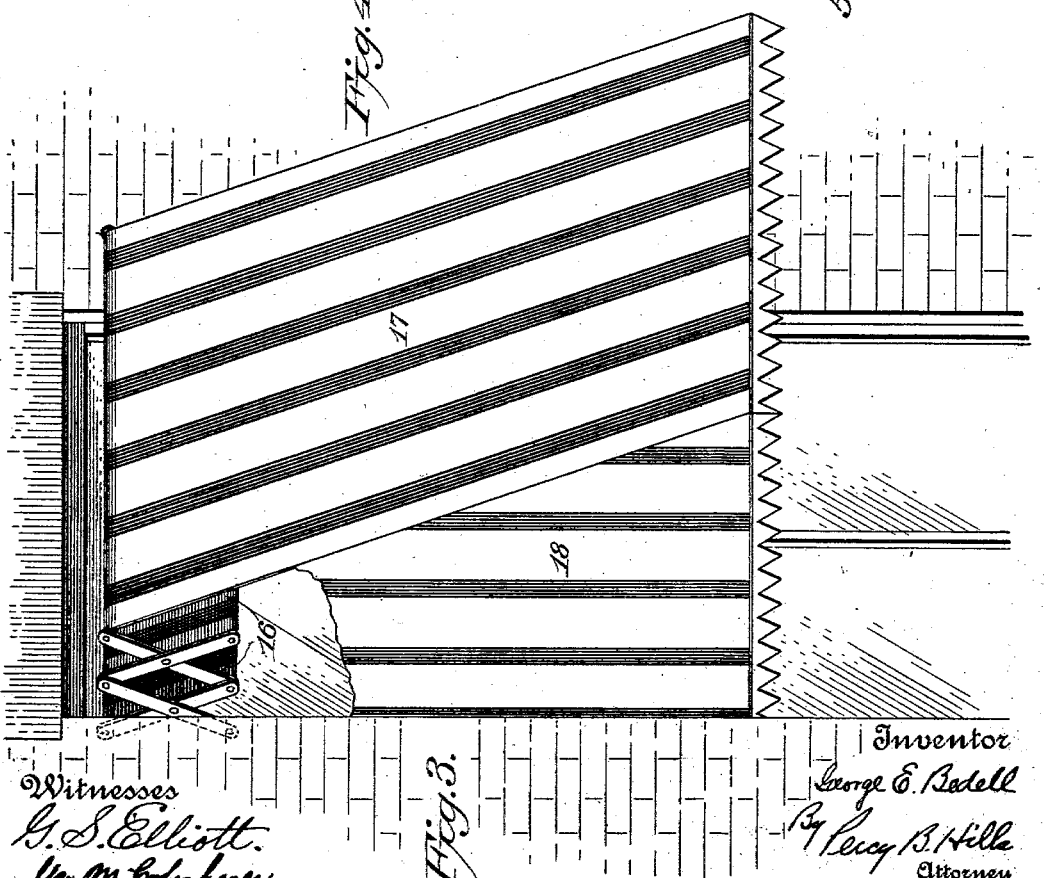
Witnesses
G. S. Elliott.
Geo. M. Copehaver.
Inventor
George E. Bedell
By Percy B. Hills
Attorney

UNITED STATES PATENT OFFICE.

GEORGE EDGAR BEDELL, OF HERKIMER, NEW YORK.

AWNING.

SPECIFICATION forming part of Letters Patent No. 720,999, dated February 17, 1903.

Application filed April 13, 1900. Serial No. 12,729. (No model.)

*To all whom it may concern:*

Be it known that I, GEORGE EDGAR BEDELL, a citizen of the United States, residing at Herkimer, in the county of Herkimer, State of New York, have invented new and useful Improvements in Awnings, of which the following is a specification.

My invention relates to awnings, and has for its primary object to provide a structure thoroughly ventilated at its top and which at the same time effectually excludes the sun's rays and deflects rain, said awning being capable of the same manipulation in extending and contracting as is the ordinary window-awning now in common use.

Certain other minor novel embodiments are disclosed in my improved construction, as will be hereinafter definitely pointed out and claimed, reference being had to the accompanying drawings, in which—

Figure 1 is a perspective view of a window-awning embodying my improved construction, the side flap being partly broken away. Fig. 2 is a central vertical sectional view of the same. Fig. 3 is a view similar to Fig. 1 of a modified construction, and Fig. 4 is a view similar to Fig. 2 of said modified construction.

As far as possible similar numerals of reference denote corresponding parts in the several views.

Referring more particularly to Figs. 1 and 2, it will be seen that the frame for the upper portion of the awning consists of what is commonly known as a "lazy-tongs" structure, the same being in duplicate at each side of the awning and consisting each of arms 1 and 2, pivoted to each other intermediate their length at 3, the arms 1 being pivoted at their inner ends to a transverse rod or bar 4, fixed in the window-frame 5. Said arms 1 and 2 are connected at their outer ends by transverse rods or bars 6 and 7, the connections being pivotal, while from said rod or bar 6 extend arms 8, similar to arms 1 and lying parallel therewith, the same being supported intermediate their length by arms 9, pivoted thereto at 10 and extending from the rod or bar 7, the outer ends of arms 8 being connected by rod or bar 11.

The lower free end of one of the arms 2 has pivoted thereto a rod 12, extending down the window-frame and terminating at its lower end in a suitable handle 13, as shown, said rod having a recess 14 intermediate its length to engage with a suitable stud 15 on the window-frame.

Extending transversely of the awning-frame, between the arms 1 and from bar 4 to bar 7, is a canvas 16, while from bar 6 extends the front flap 17 of the awning, the same passing outward over the bar 11 and dropping downward vertically therefrom, as shown. Side flaps 18 are connected to bars 4, 6, and 11 and correspond in length to the front flap 17.

Extending transversely of the front flap 17 and intermediate its length is a bar 19, to which is attached a cord 20, passing upwardly over rods 11, 6, and 4 and then downwardly to within reach of the operator, while from the lower front ends of side flaps 18 extend cords 21, passing diagonally upward over rod 4 and then downward also within reach of the operator, all for purposes hereinafter to be described.

From the above description the operation of my improved construction will be understood to be as follows: The dead-weight of the front flap 17, bearing on rod 11, tends to collapse the lazy-tongs frame and to fold the awning down against the window-frame in its closed position, to overcome which, and thus open the awning, it is only necessary to push up rod 13 and engage recess 14 therein with stud 15, in which position the awning is open, as shown in the drawings. In this open position it will be observed that there is a vertical transverse open space between the rods 6 and 7, the same affording a thorough ventilation for the upper part of the awning and yet excluding the sun's rays and deflecting rain. To open either side of the awning, it is only necessary to draw down one or both cords 21, thereby drawing up the outer ends of the side flaps 18, while to open the front of the awning the cord 20 is pulled down, thereby drawing up rod 19, and with it the lower portion of the front flap 17, to any desired height.

In Figs. 3 and 4 I have illustrated a somewhat modified construction, the ventilating feature of the upper portion of the awning being retained, said awning conforming more nearly to the ordinary construction in that it employs the usual frame 22 at the bottom, pivoted to the window-frame 5 at 23. In this construction the dead-weight of the awning tends to keep the lazy-tongs frame open, and the same is folded by pulling on the usual cord or cords 24. In this construction also there are two strips of canvas 16, and consequently two ventilating-spaces, as will be readily understood.

Having thus described my invention, what I claim as new, and desire to secure by Letters Patent, is—

1. An awning having at its upper portion a lazy-tongs supporting-frame, strips of protecting material extending transversely between the arms of said lazy-tongs leaving intervening open spaces when said frame is extended, said strips deflecting water and excluding the rays of the sun, substantially as described.

2. An awning having at its upper portion a lazy-tongs supporting-frame, strips of protecting material extending transversely between the arms of said lazy-tongs and substantially parallel with each other, leaving intervening open spaces when said frame is extended, said strips deflecting water and excluding the rays of the sun, substantially as described.

3. In an awning, the combination with the front and side flaps thereof, of a lazy-tongs frame at the top thereof and forming the support therefor, and strips of protecting material extending transversely between the arms of said lazy-tongs leaving intervening open spaces when said frame is extended, said strips deflecting water and excluding the rays of the sun, substantially as described.

4. An awning having at its upper portion a lazy-tongs supporting-frame, parallel strips of protecting material extending transversely between the arms of said lazy-tongs and extending downwardly and outwardly and overlapping vertically, but not contacting and leaving intervening open spaces therebetween, substantially as described.

5. In an awning, the combination of a collapsible lazy-tongs frame at the upper end thereof, strips of protecting material extending between its outwardly and downwardly extending arms leaving open spaces therebetween, a front flap extending downwardly from the outer end of said frame, side flaps also supported from said frame, and means for expanding and collapsing said frame and for raising and lowering said front and side flaps, substantially as described.

6. In an awning, the combination of a collapsible lazy-tongs frame at the upper end thereof, strips of protecting material extending between its outwardly and downwardly extending arms leaving an open space therebetween, a front flap extending downwardly from the outer end of said frame, side flaps also supported from said frame, means for expanding and collapsing said frame, and independent means for raising and lowering said front and side flaps, substantially as described.

In testimony whereof I have hereunto set my hand in the presence of two subscribing witnesses.

GEORGE EDGAR BEDELL.

Witnesses:
 PERCY B. HILLS,
 GEO. M. COPENHAVER.